(12) United States Patent
Gao

(10) Patent No.: US 11,245,140 B2
(45) Date of Patent: Feb. 8, 2022

(54) BATTERY PACK SPRAY COOLING

(71) Applicant: Baidu USA LLC, Sunnyvale, CA (US)

(72) Inventor: Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 158 days.

(21) Appl. No.: 16/557,761

(22) Filed: Aug. 30, 2019

(65) Prior Publication Data

US 2021/0066767 A1    Mar. 4, 2021

(51) Int. Cl.
*H01M 10/613*    (2014.01)
*H01M 10/6567*    (2014.01)
*H01M 50/20*    (2021.01)

(52) U.S. Cl.
CPC ..... *H01M 10/613* (2015.04); *H01M 10/6567* (2015.04); *H01M 50/20* (2021.01)

(58) Field of Classification Search
CPC . H01M 10/613; H01M 10/6567; H01M 50/20
See application file for complete search history.

(56) References Cited

U.S. PATENT DOCUMENTS

| | | | | |
|---|---|---|---|---|
| 5,524,681 A | * | 6/1996 | Davies | F01P 11/02 141/92 |
| 2012/0247713 A1 | * | 10/2012 | Radermacher | H01M 10/63 165/41 |
| 2013/0031382 A1 | * | 1/2013 | Jau | H02J 9/00 713/300 |

* cited by examiner

*Primary Examiner* — Olatunji A Godo
(74) *Attorney, Agent, or Firm* — Womble Bond Dickinson (US) LLP

(57) ABSTRACT

According to one embodiment, a battery module includes an output connector, several battery cells that are coupled to the output connector, and several spray nozzles and spray cooling loop and system. The battery cells are configured to provide battery energy to a load via the output connector and are configured to draw power from an external power supply to charge the battery cells via the output connector. The spray nozzles are configured to spray coolant on the battery cells to transfer heat generated by the battery cells to the sprayed coolant.

20 Claims, 10 Drawing Sheets

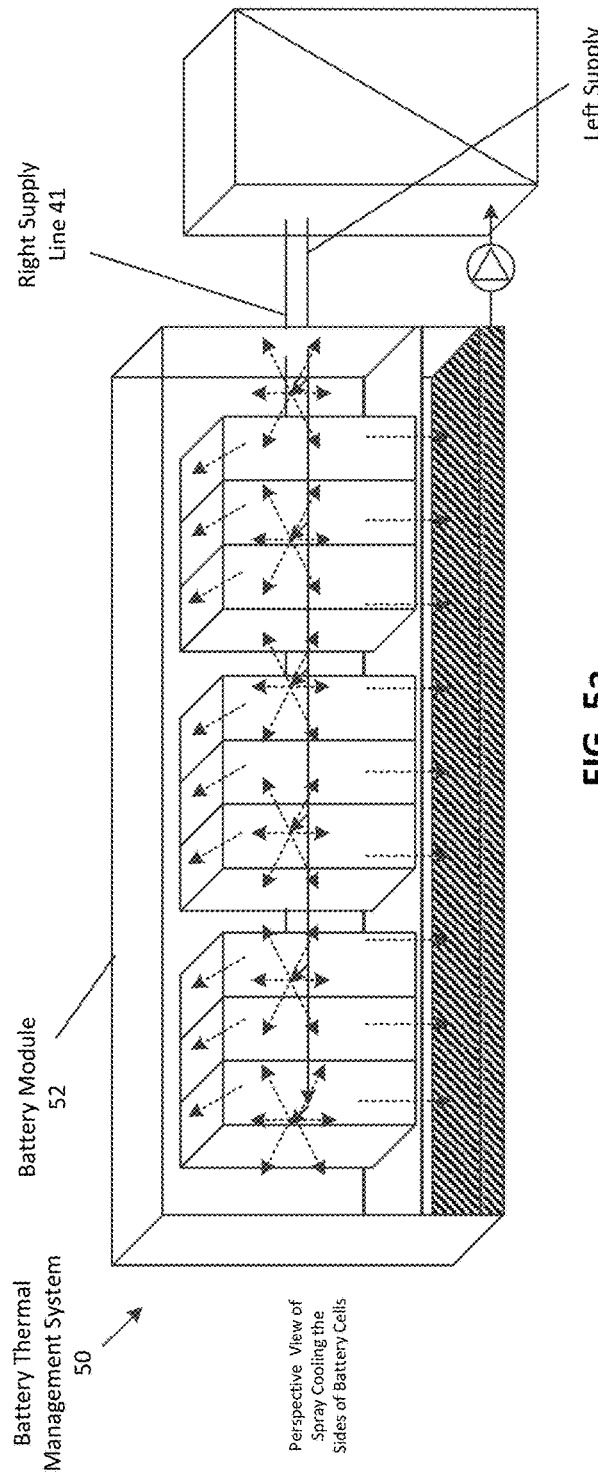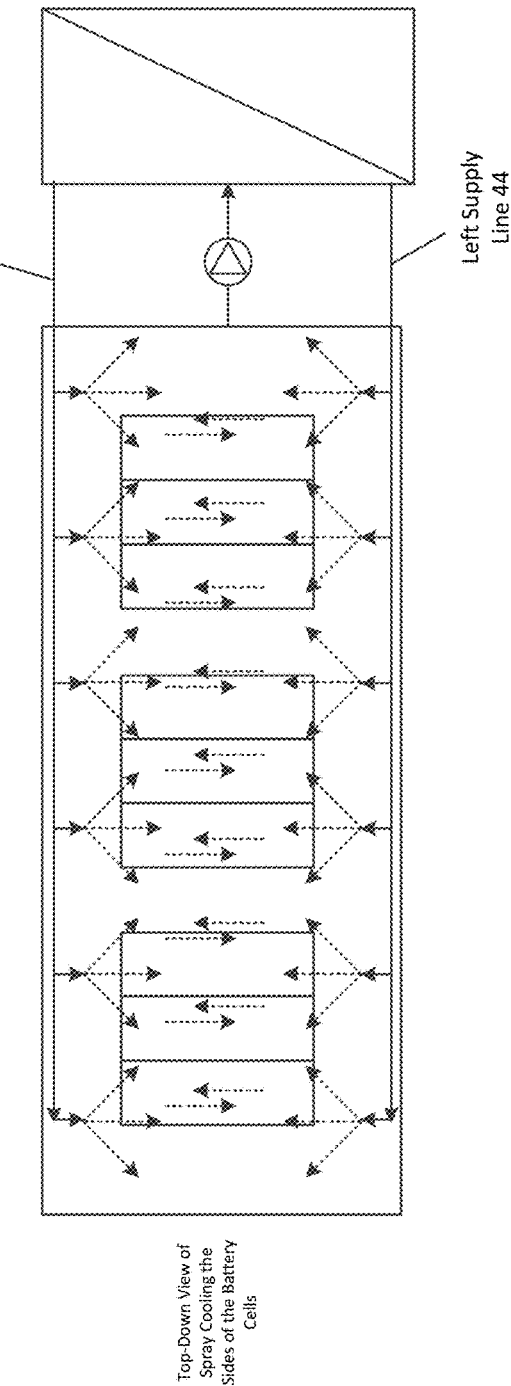

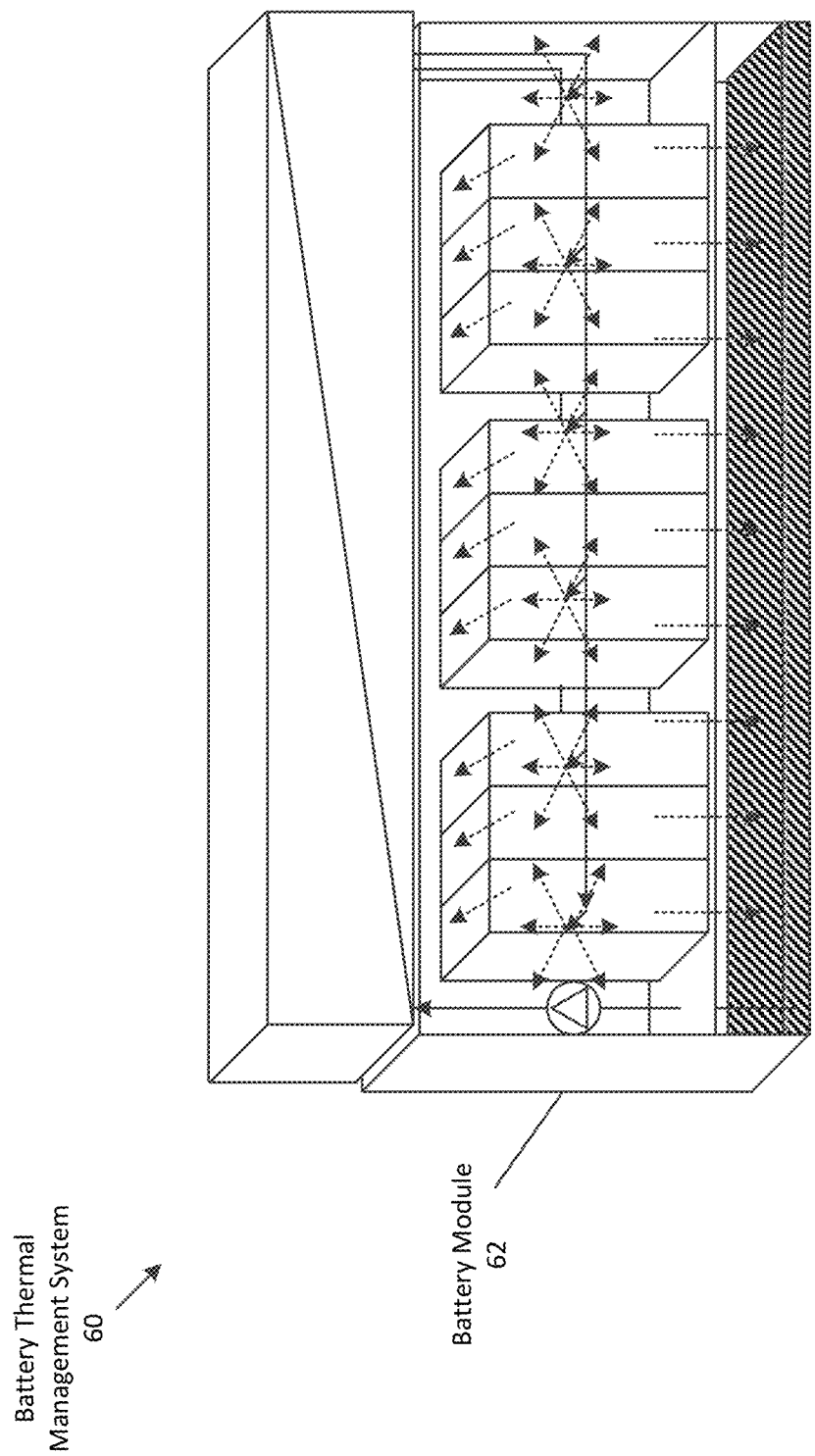

BATTERY PACK SPRAY COOLING

FIELD

Embodiments of the present disclosure relate generally to a backup thermal management system that cools battery packs. More particularly, embodiments of the disclosure relate to a system that sprays coolant upon battery cells in a battery pack while the cells discharge and/or charge.

BACKGROUND

Lithium-ion batteries are commonly used in the vehicle industry, for example, electric vehicles (EVs) and plug-in hybrids. Lithium-ion battery packs for electric vehicles are designed for vehicle specific requirements and usage. Lithium-ion batteries, however, are also becoming popular for IT equipment and data center as an energy storage unit that is replacing UPS systems and lead acid batteries and attracting much attention from the industry.

Large clusters of computer servers can be kept in dedicated facilities, often in a rack enclosure. The servers can be used in support of the data center industry. Use of a battery backup unit (BBU) in place of traditional solutions, such as lead-acid based Uninterruptible Power Supply (UPS) systems, has grown in popularity. One result of the BBU's new role in the data center space is the relocation of the BBU from a centralized battery room to a data center IT room. Thermal environment (e.g., temperature) in the data center is generally managed and operated based on specifications and requirements of the servers, not batteries, or may not be optimized for BBU and therefore may not be optimized for BBU use.

In contrast, in the case of a BBU, the battery provides power only when backup power is needed (e.g., there is a power outage to the data center). When backup power is no longer needed (e.g., grid power is restored to the data center), the BBU is recharged. Thus, a unique problem in the BBU application is that thermal management or cooling will be active only during limited times: e.g., discharging during a power outage and charging after power is restored. Therefore, a battery thermal management system is needed that self-activates during times at which the batteries charge and discharge in order to ensure that the batteries do not over heat.

In addition, a self-activating thermal management system should be fast enough to avoid thermal overshoot, which can negatively impact battery performance and battery lifetime, and an optimized design should have all cells evenly cooled. These systems, however, may not evenly cool battery cells, which could result in at least some thermal overshoot. Therefore, there is a need for a self-activating thermal management system that evenly cools batteries in order to maintain battery performance.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

FIGS. 5a and 5b are block diagrams illustrating different views of another example of a battery thermal management system according to one embodiment.

FIG. 6 is a block diagram illustrating a perspective view of another example of a battery thermal management system according to one embodiment.

DETAILED DESCRIPTION

Figure 1:
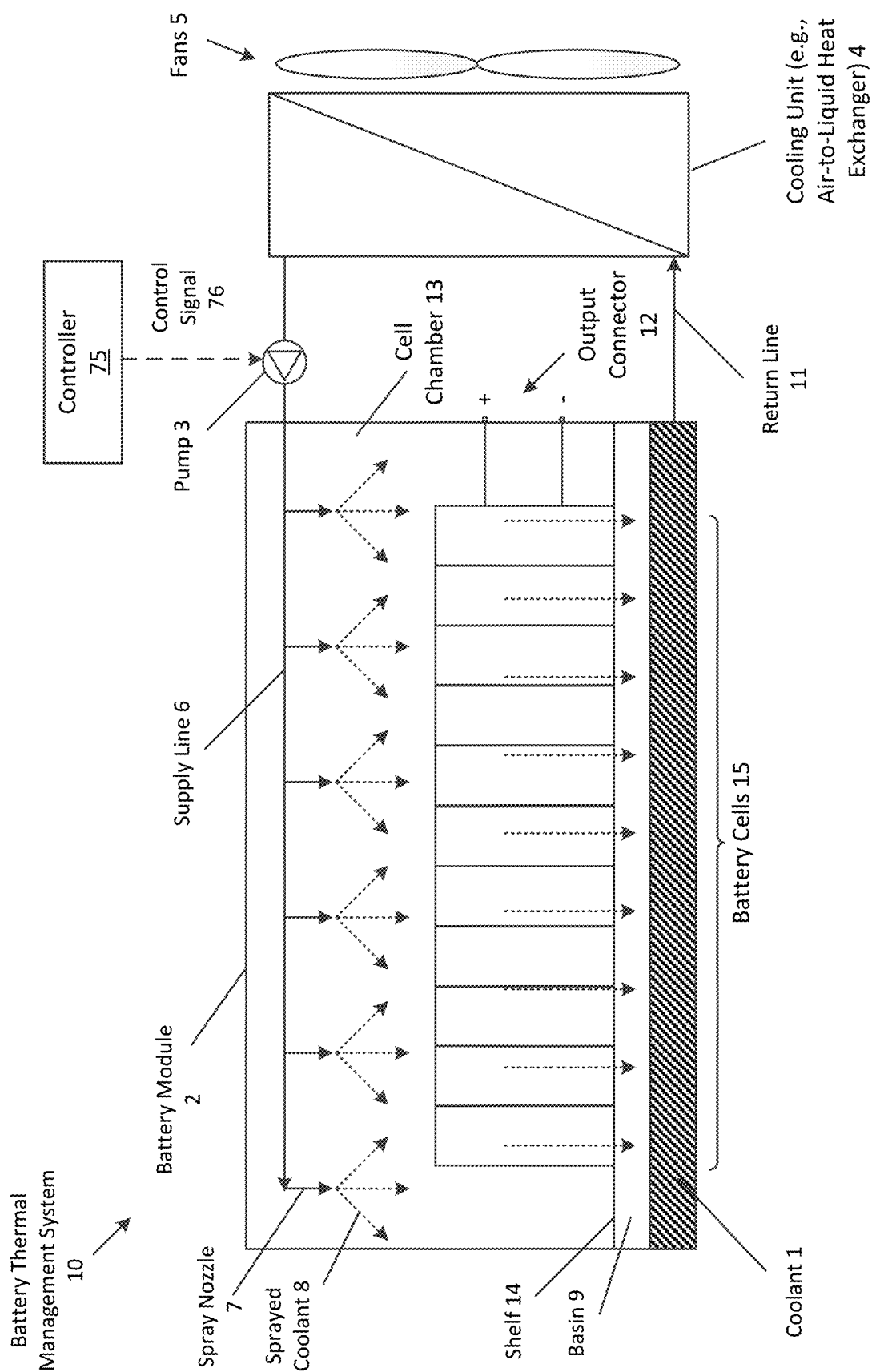
FIG. 1 is a block diagram illustrating an example of a battery thermal management system that includes a battery module with spray cooling according to one embodiment.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of the each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, a battery module includes an output connector, several battery cells that are coupled to the output connector, and several spray nozzles. The battery cells are configured to provide battery energy to a load via the output connector and are configured to draw power from an external power supply to charge the battery cells via the output connector. The spray nozzles are configured to spray coolant on the battery cells to transfer heat generated by the battery cells to the sprayed coolant.

In one embodiment, the battery module includes a supply line that is coupled to each of the spray nozzles and is coupled to a cooling unit, where the supply line is configured to supply coolant to the spray nozzles from the cooling unit. In another embodiment, the battery module includes a basin that is located below the battery cells and is configured to collect the coolant that is sprayed by the spray nozzles. In some embodiments, the battery module includes a pump that is coupled between the supply line that is coupled to the spray nozzles and the cooling unit and is configured to draw coolant from the cooling unit and push the coolant through the supply line and out the spray nozzles. While the pump draws and pushes coolant, the cooling unit is configured to draw coolant that is collected in the basin via a return line, thereby creating a heat transfer loop. In some embodiments, the battery cells, the spray nozzles, the supply line, the pump, and the cooling unit are sealed within the battery module.

In another embodiment, the spray nozzles are located above the battery cells. In one embodiment, the spray nozzles are located along at least one side of the battery cells. In some embodiments, the spray nozzles are configured to spray coolant when the battery cells are either 1) providing battery energy to the load or 2) drawing power from the power supply. In another embodiment, the battery cells are at least partially submerged within coolant that is collected at the bottom of the battery module.

In one embodiment, the battery module includes a coolant spraying panel that includes a pressurized chamber that is configured to hold coolant at a higher pressure than outside of the chamber, where each of the spray nozzles is coupled to the coolant spraying panel and each is configured to spray pressurized coolant on the battery cells.

According to another embodiment, a battery backup unit (BBU) that is configured to provide backup power includes a set of one or more battery modules, where each may be similar to the battery module as previously described. In one embodiment, the battery module (and/or BBU) further includes a pump and a cooling unit that along with the battery module create a heat transfer loop. In another embodiment, the cooling unit is located at one side of the battery module or on top of the battery module. In some embodiments, the battery module is removeably coupled to at least one of the pump and the cooling unit.

According to one embodiment, an electronic rack includes several server blades and other IT equipment arranged in a stack, each server blade including one or more servers to provide data processing services, a power supply coupled to the server blades to provide power to operate the servers, and a BBU coupled to the server blades to provide backup power to the servers when the power supply is unable to provide power. The BBU includes at least one battery module, each battery module is similar to the battery module as previously described.

In one embodiment, a cooling system or a battery thermal management system for a battery module can address specific needs of backup power provided by a BBU in support of IT racks in a data center or IT room environment. As described, conditions and requirements of a BBU in an IT rack, data center, and/or IT room environment are different from conditions and requirements of a battery module in an electrical vehicle application. For example, thermal environments are different, and the discharging and charging cycles occur much less in the data center application scenario than in the electrical vehicle application.

Cooling systems for batteries can be critical because nominal battery performance is typically specified for working temperature ranges of battery cells (e.g., 25° C. to 35° C.). Temperature also plays an important role with respect to battery aging. Temperatures outside of the working range may result in reduced performance and negatively impact battery health. In addition, when multiple battery cells are connected, there can be large internal differences between different cell temperatures due to multiple factors, such as cell arrangement and cooling condition variations, which can lead to different charge and discharge rates for each cell and deteriorate performance of the battery module. If battery temperature exceeds thermal limits, this can cause extreme damage or harm, even catastrophic results. Thus, the thermal management of battery system is an important feature to consider in the design and operation of a battery because it impacts how a battery performs, the health and lifetime of the batter, and safety.

A battery thermal management system for a BBU can be self-activating by utilising spray cooling. In one embodiment, the thermal management system includes a battery module that includes 1) an output connector, 2) several battery cells that are coupled to the output connector, and 3) several spray nozzles. To utilize spray cooling, the system causes the spray nozzles to spray coolant on the battery cells to transfer (or exchange) heat generated by the battery cells into the sprayed coolant, while the cells either provide battery energy to a load via the output connector or draw power from an external power supply to charge the battery cells via the output connector.

Such a system that uses spray cooling provides several advantages to conventional cooling methods such as air cooling. For instance, air cooling (e.g., the use of external fans that blow cool air to dissipate generated heat) may not evenly cool battery cells when surfaces of the cells do not come in direct contact with air flow produced by the fans. Spray cooling on the other hand may enable even cooling because the coolant may be evenly sprayed to cover multiple surfaces of the battery cells, where the coolant is sprayed on the cells at a similar (or same) temperature.

It should be mentioned that the phrase "battery pack" may be used herein interchangeably with "battery backup unit module (BBU module)" and with "BBU pack". Also, a BBU may include one or more battery modules (or battery packs). A battery module may include several battery cells. Other features are also described in the following examples.

FIG. 1 is a block diagram illustrating an example of a battery thermal management system that includes a battery module with spray cooling according to one embodiment. Specifically, this figure shows a battery thermal management system 10 (or system) with a battery module 2, a (e.g., mechanical) pump 3, a cooling unit 4, a controller 75, and one or more fans 5. In one embodiment, the system 10 may include more or less elements as described herein. For example, the system may include two or more battery modules, each of which are coupled to the cooling unit 4 or separate cooling units.

The battery module 2 has a cell chamber 13 and a basin 9 that includes coolant 1. The chamber includes several battery cells 15 that are positioned (or located) on a shelf 14 that separates the cell chamber from the basin. The chamber also includes several spray nozzles 7, each of which are coupled to a supply line 6. In one embodiment, the module may have any shape and configuration. For example, as illustrated, the battery module is a rectangular box. In other embodiments, however, the module may be a square box or a cylinder. In some embodiments, the battery module may include one battery cell, or may include two or more battery cells that are series connected, parallel connected, or a combination thereof. The battery cells 15 may be of any type, such as Lithium-ion, Nickel Cadmium, etc. The battery module also includes an output connector 12 (one anode and one cathode) that is coupled to the battery cells and is configured to couple to a load (e.g., the load may be at least one server) in order for the battery module to provide battery energy stored within the cells to the load via the output connector, and is configured to couple to an external power supply (or source) in order for the battery module to draw power from the power source to charge the battery cells via the connector. In one embodiment, the output connector 12 is configured to be removeably coupled to (e.g., connectors of) the load in order to allow the battery module to be removed and/or added (in series or in parallel) to the load.

As described herein, the supply line 6 is configured to supply coolant (which may be any type of liquid (or fluid), such as a dielectric liquid) to one or more of the spray nozzles 7, which are configured to spray the coolant 8 on one or more of the battery cells 15 to exchange heat generated by the battery cells, while the cells are in operation (e.g., while the cells discharge and/or charge). Specifically, the supply line is coupled to the cooling unit 4, and is configured to supply coolant that is drawn by (or from) the cooling unit. In one embodiment, each of the spray nozzles 7 may spray coolant in a similar fashion to one another (e.g., as illustrated by each nozzle having three dotted arrows) in order to evenly spray coolant on at least some (or all) of the battery cells. In another embodiment, at least some of the nozzles may spray coolant differently than other nozzles. For example, at least some nozzles may spray coolant in a particular direction and/or at least some nozzles may spray coolant in an omni-directional manner.

The basin 9 is located below the battery cells 15 and is configured to store (hold or collect) coolant 1. In addition, the basin 9 is configured to collect sprayed coolant 8 (which may be the same as coolant 1 that is sprayed by one or more of the nozzles 7. To collect sprayed coolant 8, a shelf 14, on which sits the battery cells 15, is configured to allow the coolant to pass from the cell chamber 13 to the basin 9. For example, the shelf may include one or more holes or openings that allow the coolant to pass through.

As illustrated, a pump 3 and a return line 11 are coupled to the battery module 2. Specifically, the pump is coupled between the supply line 6 that is coupled to the nozzles 7 and the cooling unit 4, and the return line 11 couples the battery module 2 to the cooling unit 4. In one embodiment, the supply line 6 and the return line 11 may be hoses or pipes composed of any material. For instance, the lines may be composed of metal, such as copper, a polymer (e.g., an EPDM rubber), and/or plastic. In one embodiment, the lines may be composed of a flexible material such as rubber. In some embodiments, one line (e.g., the supply line) may be composed of different material than the other line (e.g., the return line).

In one embodiment, the pump 3 is configured to draw coolant from the cooling unit and push the coolant through the supply line and out the spray nozzles. In one embodiment, the pump 3 may be coupled to the cooling unit via a separate supply line, or the pump may be directly coupled to the cooling unit. In some embodiments, the pump may be coupled between the return line 11 and the cooling unit 4, and be configured to push coolant that is drawn from the basin 9 through the cooling unit. In another embodiment, the pump 3 may be configured to be removeably coupled to the supply line and/or the cooling unit, in order to allow a user to remove/replace the pump as needed. In some embodiments, the pump may be any type of mechanical pump. In one embodiment, the pump may be controlled to push coolant at a particular flow rate (e.g., by the controller 75). More about controlling the pump is described herein.

The cooling unit 4 may be any type of cooling unit that is configured to extract thermal energy from coolant or cooling fluid. As illustrated, the unit 4 is an air-to-liquid heat exchanger that is coupled to the pump 3 and is coupled to the battery module 2 (e.g., via the return line 11), and that has one or more fans 5 that are used to disperse heat. In one embodiment, the unit 4 may be a liquid-to-liquid heat exchanger. In one embodiment, the system 10 may not include a cooling unit for the battery module, but instead may be coupled to a separate, external, cooling unit or cooling loop.

The controller 75 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory. In one embodiment, the controller 75 may be a part of the battery module 2 (e.g., contained within the module or coupled to the outside of the module), or may be communicatively coupled to the battery module (e.g., may be a part of circuitry of a BBU pack or of an electronic rack that is holding the BBU pack).

In one embodiment, the controller 75 is configured to control the pump 3 (e.g., by transmitting a control signal 76 to control circuitry of the pump, such as an electronic switch) in order to activate the heat-transfer (or heat-exchanging) loop. Specifically, the controller 75 may monitor certain criteria to determine whether or not coolant should be sprayed upon the battery cells. For example, the controller 75 may determine whether current is flowing from (or into) the battery cells (based on a current sense), which may indicate that the cells are in operation (e.g., discharging and/or charging). As another example, the controller 75 may be communicatively coupled to a temperature sensor (not shown) that is positioned within the cell chamber 13 (or on the battery module). The controller 75 may obtain an electronic signal from the sensor that represents a temperature reading. If the reading is above a threshold value, the controller 75 may activate the pump in order to cool the cells. Once the cells reach (or are below) the threshold value (and/or the cells are no longer discharging/charging), the controller 75 may deactivate the pump. In another embodiment, the controller 75 may adjust the flow rate of the coolant within the heat-exchanging loop by adjusting a rate at which the pump pushes coolant. The controller 75 may adjust the rate based on the criteria mentioned herein. For instance, the flow rate may be based on the temperature reading (e.g., a higher reading results in a higher flow rate).

Thus, during operation the battery thermal management system 10 creates a heat exchanging loop that expels thermal energy that is absorbed by the sprayed coolant 8 in order to manage an operational temperature of the cells. For example, when the battery cells 15 discharge/charge, the pump 3 is configured to activate (e.g., by the controller 75) and push coolant into the supply line 6 and out the spray nozzles 7. The sprayed coolant 8 comes into contact with the battery cells 15 that are generating heat, and extracts thermal energy from the cells, thereby cooling the cells. The coolant 8 then traverses through the shelf 14 and collects in the basin 9. While the pump pushes the coolant, the cooling unit 4 is configured to draw coolant that is collected in the basin via the return line 11, and extract the thermal energy from the coolant. Thus, the coolant that circulates through the system 10 absorbs thermal energy from the battery cells 15, and that energy is expelled by the cooling unit 4.

Figure 2:
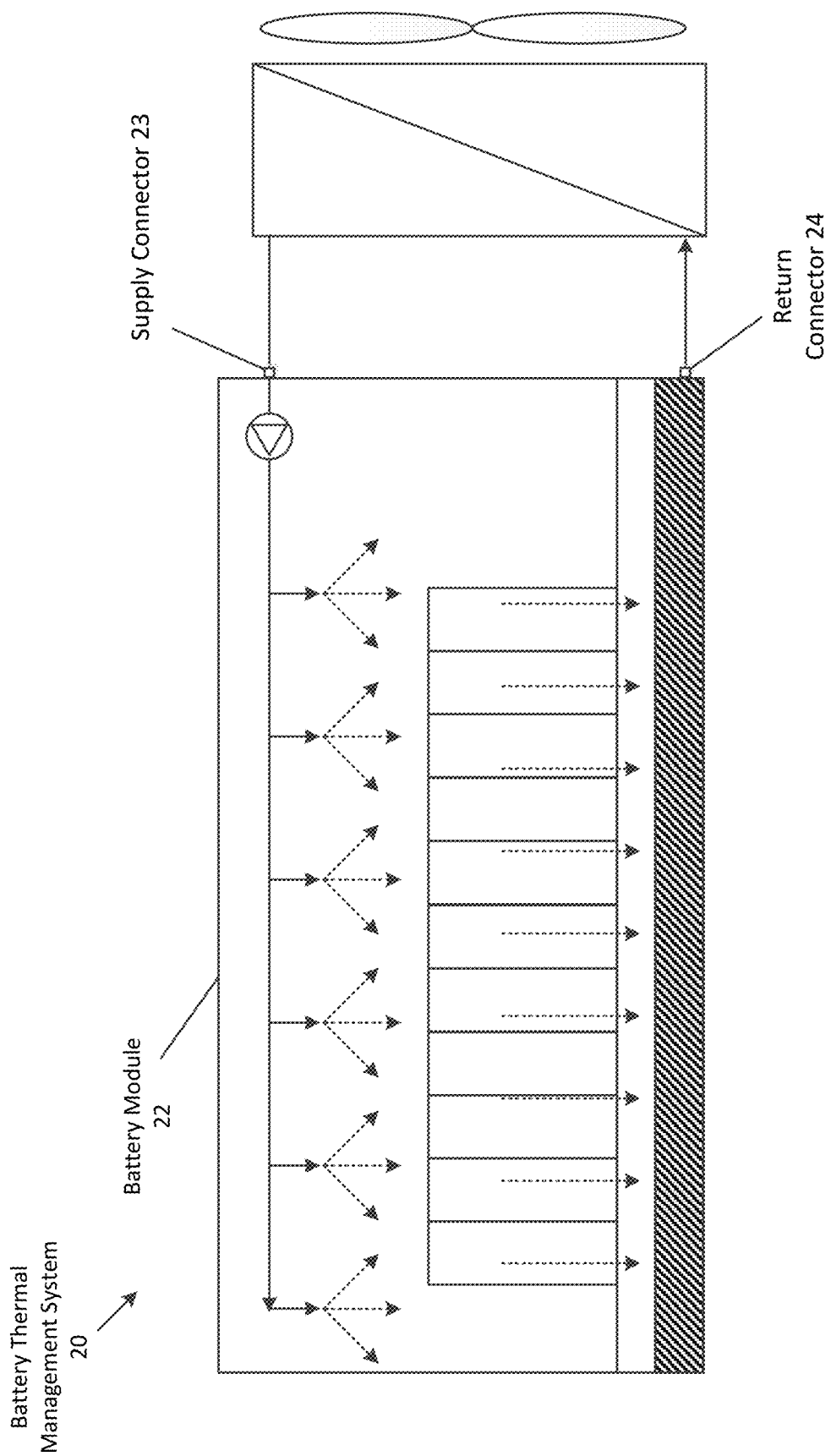
FIG. 2 is a block diagram illustrating another example of a battery thermal management system in which a battery module with spray cooling includes a pump according to one embodiment.

FIG. 2 is a block diagram illustrating another example of a battery thermal management system in which a battery module with spray cooling includes a pump according to one embodiment. As shown, the system 20 includes a battery module 22, which is similar to module 2 but a difference being the pump 3 is coupled to the supply line 6 within the (e.g., cell chamber of the) battery module. In this example, the battery module also includes a supply connector 23 that is coupled to the pump (e.g., either directly coupled or via a separate line) and is removeably coupled to the cooling unit 4, and a return connector 24 that is removeably coupled to the cooling unit 4. In one embodiment, both connectors may be directly removeably coupled to the cooling unit 4, or may be coupled to the cooling unit 4 via respective separate supply and return lines. In one embodiment, the connectors may be dripless blind mating quick disconnects. Both connectors enable the battery module to be 1) disconnected from the (e.g., separate supply and/or return lines that couple to the) cooling unit in order to remove the battery module from the heat exchanging loop, and 2) connected to the cooling unit in order to create a heat-exchanging loop. In one embodiment, the connectors may be any type of connectors, such as quick-connect fittings that allow for easy connection/removal of the battery module.

Figure 3:
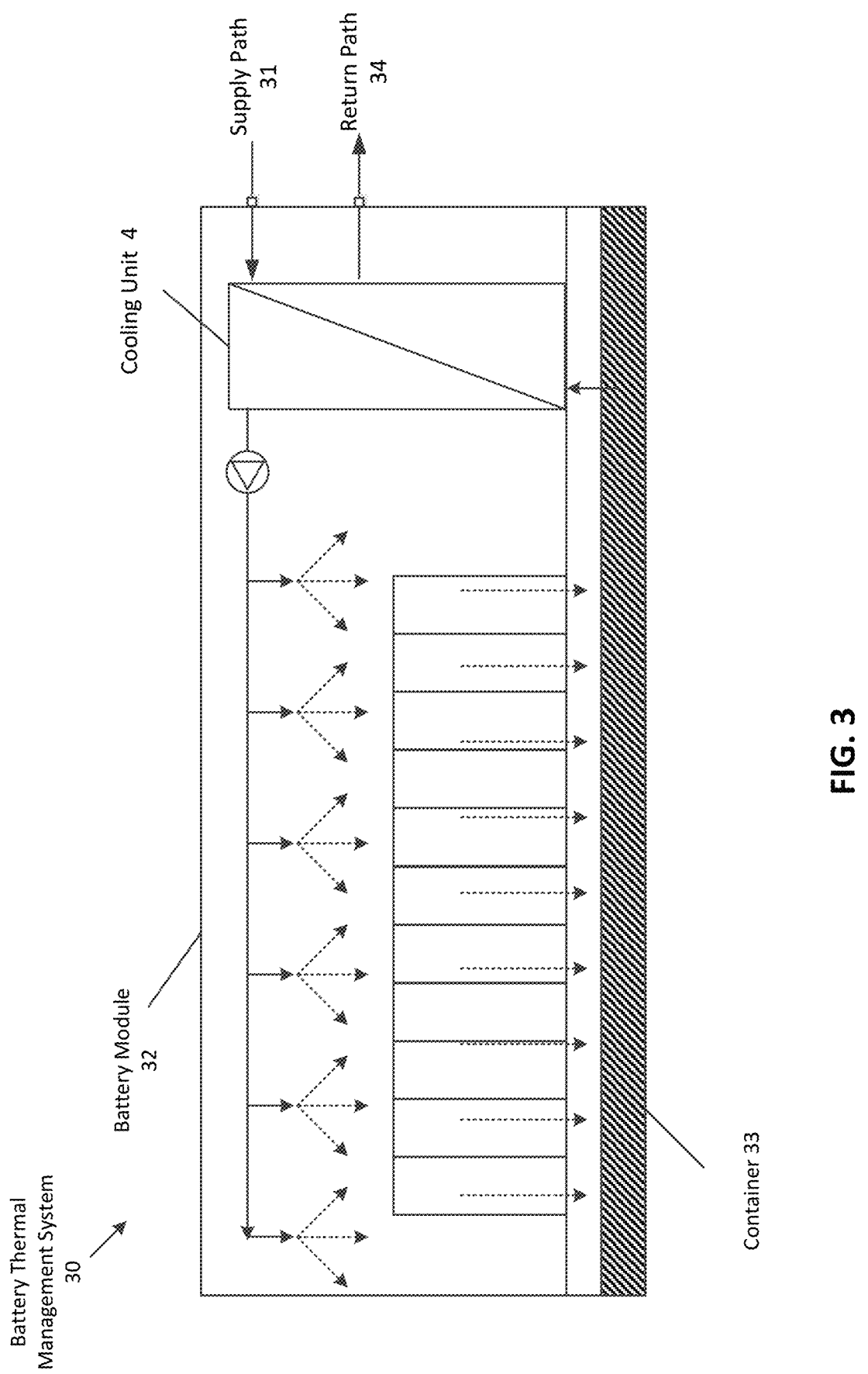
FIG. 3 is a block diagram illustrating another example of a battery thermal management system in which a battery module with spray cooling includes a pump and a cooling unit according to another embodiment.

FIG. 3 is a block diagram illustrating another example of a battery thermal management system in which a battery pack with spray cooling includes a pump and a cooling unit according to one embodiment. As shown, the system 30 includes the battery module 32 that has the heat-exchanging loop contained inside the battery module. Specifically, the pump, the supply/return lines, and cooling unit are inside the chamber. To exchange heat, the cooling unit 4 (which is a liquid-to-liquid heat exchanger) is coupled to a supply path 31 that is configured to supply cooling fluid to the cooling unit 4 and a return path 34 that is configured to receive cooling fluid from the cooling unit 4. In one embodiment, the supply path 31 and return path 34 may be coupled to an external cooling source, such as a data center cooling water system or an IT liquid cooling water system (not shown). In one embodiment, a heat-exchanging loop between the cooling unit 4 and the external cooling source may be referred to as a primary loop, while the heat-exchanging loop between the cooling unit 4 and the (e.g., coolant collected in the basis of the) battery module may be referred to as a secondary loop. Thus, during operation heat absorbed by (e.g., coolant in) the secondary loop will be transferred to cooling fluid that circulates through the primary loop. In one embodiment, the supply path 31 and return path 34 may be hoses or pipes composed of similar material as the supply lines as described herein. In another embodiment, the supply path 31 and/or return path 34 may be coupled to a distribution manifold that is configured to circulate cooling fluid through one or more battery packs (or cooling units).

In one embodiment, since the battery module includes supply and return connectors (which may be removeably coupled to the supply path 31 and return path 34) the module may be a self-contained unit. Specifically, the module may include a container 33 in which the components of the battery thermal management system (e.g., the pump and cooling unit) are sealed within the container along with the spray nozzles, the supply/return lines, and/or the battery cells. Sealing the battery module ensures that any coolant remains contained therein, thereby preventing or reducing likelihood of any potential leaks. In one embodiment, any of the battery modules illustrated in any of the battery thermal management systems herein may be sealed, where only coolant (or cooling fluid) is allowed to enter/exit the battery module (e.g., via supply and return connectors).

Figure 4:
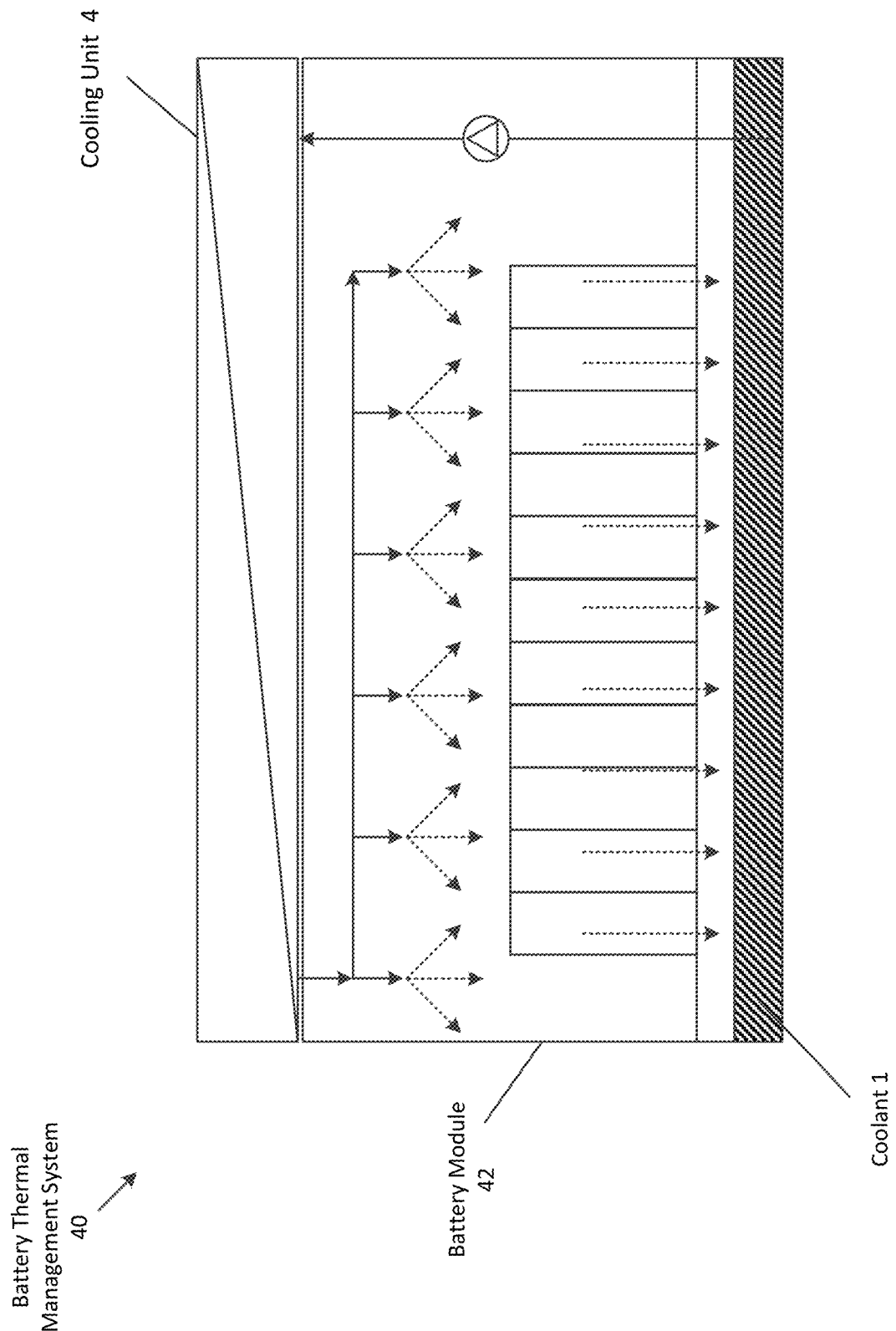
FIG. 4 is a block diagram illustrating another example of a battery thermal management system in which a cooling unit is on top of a battery module with spray cooling according to one embodiment.

FIG. 4 is a block diagram illustrating another example of a battery thermal management system in which a cooling unit is on top of a battery module with spray cooling according to one embodiment. Specifically, as described thus far, the cooling unit 4 may be located at next to (or by the side of) the battery module. In some embodiments, the cooling unit 4 may be located on top of the battery module 42, as illustrated in this example. In this example, the cooling unit of system 40 is on top of the battery module and is coupled (e.g., via connectors as described herein) to the supply line and the return line, both of which are within the module. Here, one end of the return line is submerged in the coolant 1 that is collected within the basin and the other end is coupled to the cooling unit. To circulate the coolant 1 throughout the heat-exchanging loop, the pump is coupled to the return line (e.g., between the return line and the cooling unit) in order to draw coolant from the basin and through the cooling unit. In one aspect, the cooling unit may be removeably coupled to the top of the battery module via connections or latches.

FIGS. 5a and 5b illustrate are block diagrams illustrating different views of another example of a battery thermal management system according to one embodiment. As described thus far, battery cells of the battery module may be spray cooled using spray nozzles that are located above the cells. In one embodiment, the spray nozzles may be located at different positions within the cell chamber. For instance, as illustrated in these examples the battery module 52 includes spray nozzles that are located along at least one side of the battery cells. Specifically, FIG. 5a shows a perspective view of a system 50 that spray cools the sides of the battery cells, and FIG. 5b shows a top-down view of the system 50.

These figures show that there are two supply lines, a right supply line 41 and a left supply line 44. The right supply line is coupled to a set (e.g., a first set) of spray nozzles, where the right supply line 41 is configured to supply coolant to the first set of spray nozzles to cause these nozzles to spray the coolant towards a right side of the battery cells. The left supply line is coupled to a set (e.g., a second set) of spray nozzles, where the left supply line is configured to supply coolant to the second set of spray nozzles to cause these nozzles to spray the coolant towards a left side of the battery cells. Also illustrated, the pump is coupled to the return line in order to draw coolant from the basin and into the cooling unit, rather than having a pump for each supply line. In one embodiment, each supply line may be coupled to its own pump. In another embodiment, the system may include only one supply line (e.g., only the right supply line 41) or two or more supply lines.

Also shown, the battery cells are in groups of three, where each group is separated (e.g., not abutting or touching) another group (and/or side or wall of the battery module). This is on contrast to the battery cells of FIG. 1, for example that are in one group of eleven cells. By spacing out separate groups of cells, the sprayed coolant may cover more surface area, resulting in a more even and uniform heat exchange. In one embodiment, the battery module may include one or more groups of cells that are separated from one another, where each group includes one or more cells. In another embodiment, each group of cells may be connected in any fashion (e.g., series and/or parallel).

FIG. 6 is a block diagram illustrating a perspective view of another example of a battery thermal management system according to one embodiment. Specifically, this figure shows a battery thermal management system 60 that includes a cooling unit that is on top of a battery module 62, where the module includes two supply lines that each spray coolant on different sides of the battery cells within the module.

Figure 7:
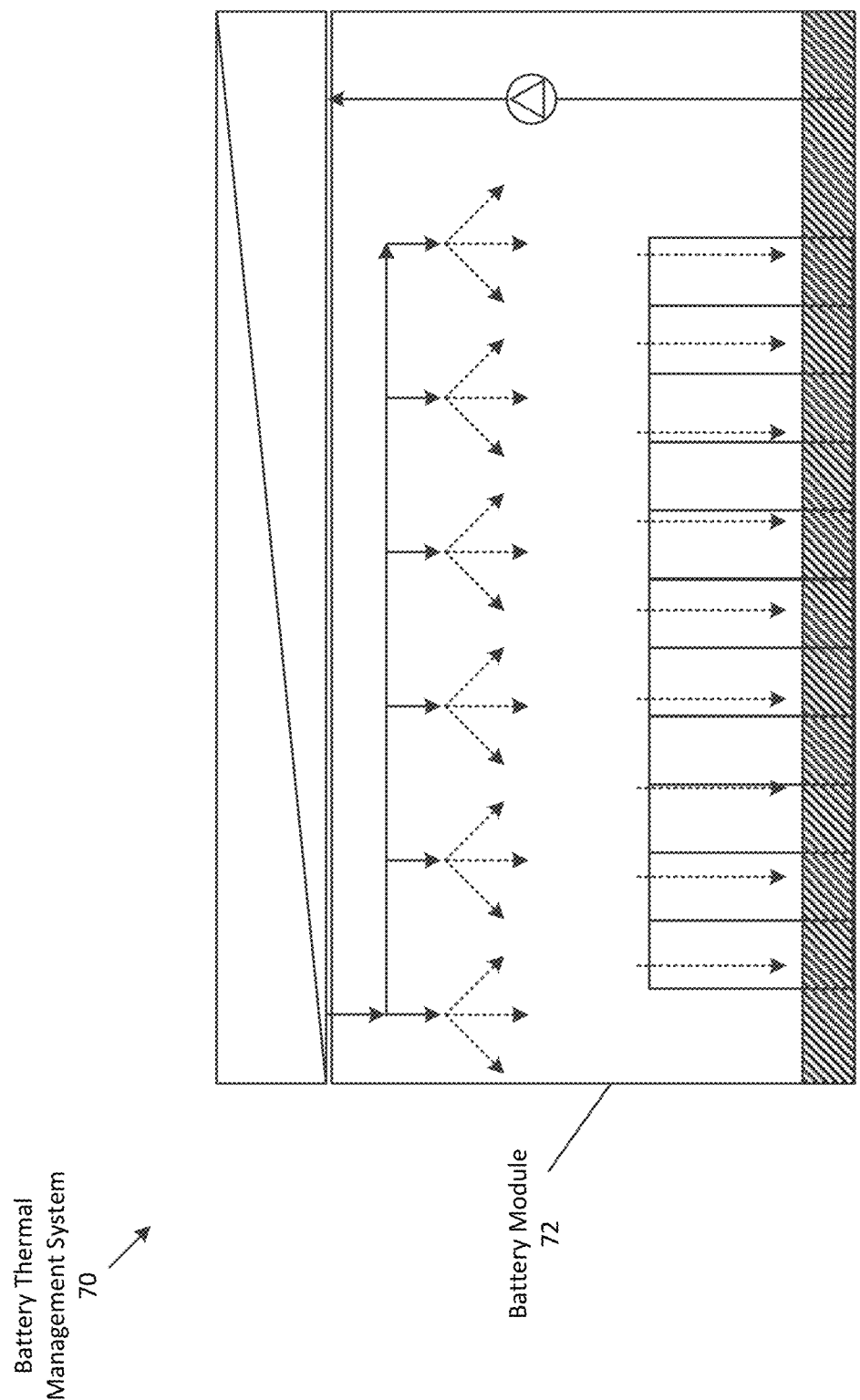
FIG. 7 is a block diagram illustrating an example of a battery thermal management system in which a battery module with spray cooling does not have a basin for collecting coolant according to one embodiment.

FIG. 7 is a block diagram illustrating an example of a battery thermal management system in which a battery pack with spray cooling does not have a basin for collecting coolant according to one embodiment. Specifically, in this example the system 70 includes a battery module 72 that does not include a shelf 14 on which the battery cells are positioned. Since the battery module does not include a shelf, the battery cells are positioned at a bottom of the cell chamber. As a result, the battery cells are at least partially submerged within coolant that is collected at a bottom of the (cell chamber of the) battery module In one embodiment, partially submerged battery cells may enable a better thermal environment for the cells.

Figure 8:
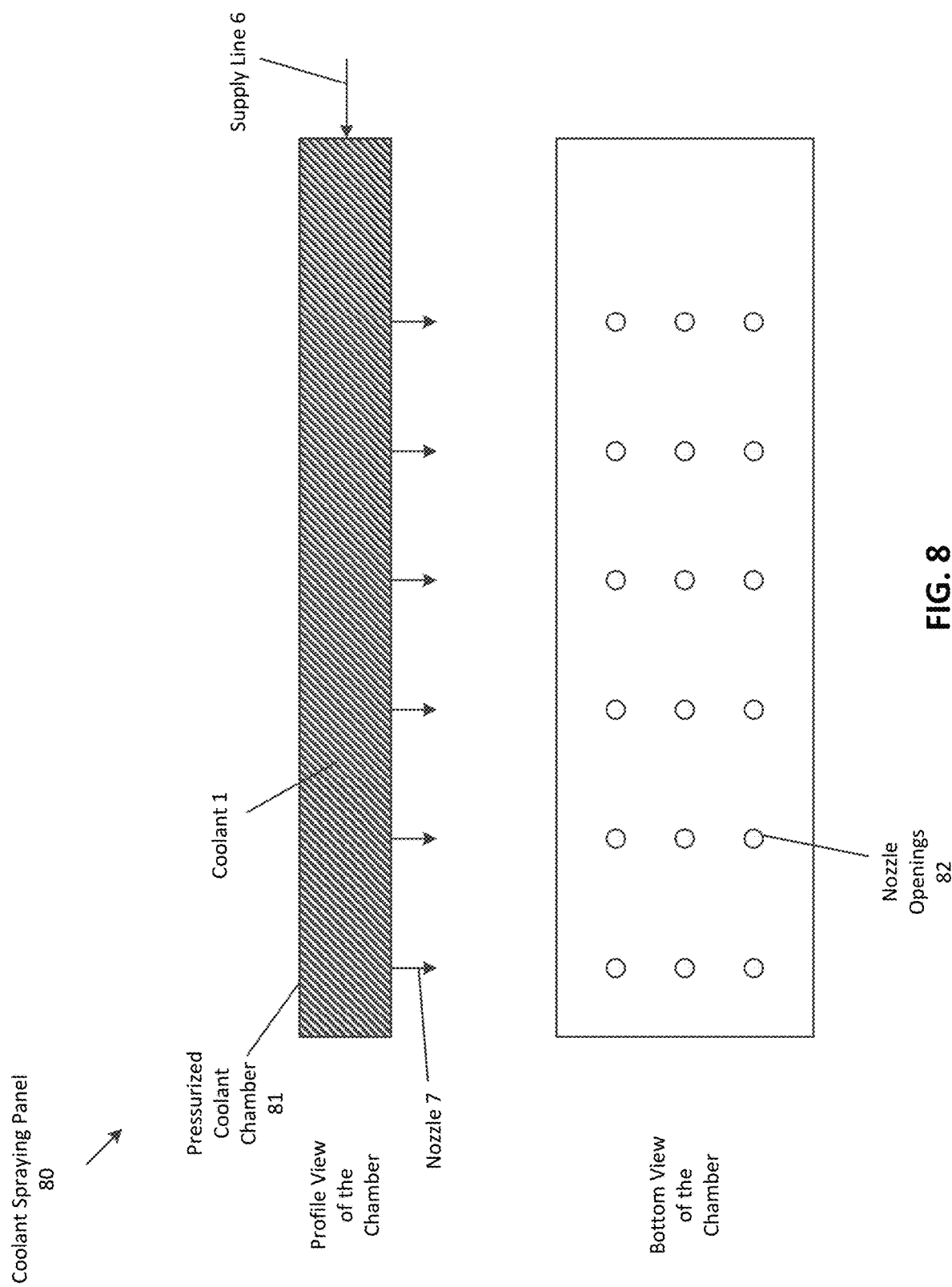
FIG. 8 is a block diagram illustrating an example of a coolant spraying panel according to one embodiment.

FIG. 8 is a block diagram illustrating an example of a coolant spraying panel according to one embodiment. Specifically, this figure shows a coolant spraying panel 80 that includes a pressured coolant chamber 81 that is configured to hold coolant 1 at a higher pressure than outside of the chamber. The panel 80 is coupled to the supply line 6, which supplies coolant from an external cooling unit (e.g., cooling unit 4). The panel 80 also includes nozzles 7 that are configured to spray pressurized coolant that is held within the chamber on one or more battery cells. In one embodiment, the panel 80 may be positioned on top of the cell chamber 13 of battery module in order to spray the pressurized coolant on top of battery cells, or may be positioned on a side of the cell chamber 13 in order to spray coolant towards a side of the cells. In some embodiments, the battery module may include two or more panels 80 that may be side by side with one another. Also illustrated is a bottom view of the chamber 81 that includes a nozzle opening 82 for each of the nozzles 7.

In one embodiment, the chamber 81 may pressurize the coolant by any method that may be used to pressurize a chamber. For example, the chamber 81 may include a bladder or diaphragm full of air that is separated from the coolant 1. The bladder pushes against the coolant, and when the nozzles are activated, causes the coolant to spray out of the nozzles at a high flow rate. In one aspect, the system may maintain the pressure within the chamber to be above a pressure threshold (or within a pressure range). The system may include a pressure sensor within the chamber that is configured to detect the pressure. When the pressure is below the pressure threshold, the pump (e.g., pump 3) that is coupled to the supply line 6 may be configured to activate, causing coolant to enter the chamber. The coolant added to the chamber will push against the bladder, causing the pressure to rise. This process may be performed while the battery cells of the battery pack are in operation.

As described above, a BBU pack can be utilized as a backup power supply unit in an electronic rack of a data center. An electronic rack includes an array of server blades, each including a computer server for data processing. The electronic rack further includes a power supply to provide power to the server blades and a BBU pack to provide backup power to the server blades or other IT equipment when the power supply is unavailable. The BBU pack may include components (e.g., a controller) that can perform cooling control operations to ensure that battery cells of the BBU pack do not overheat.

Figure 9:
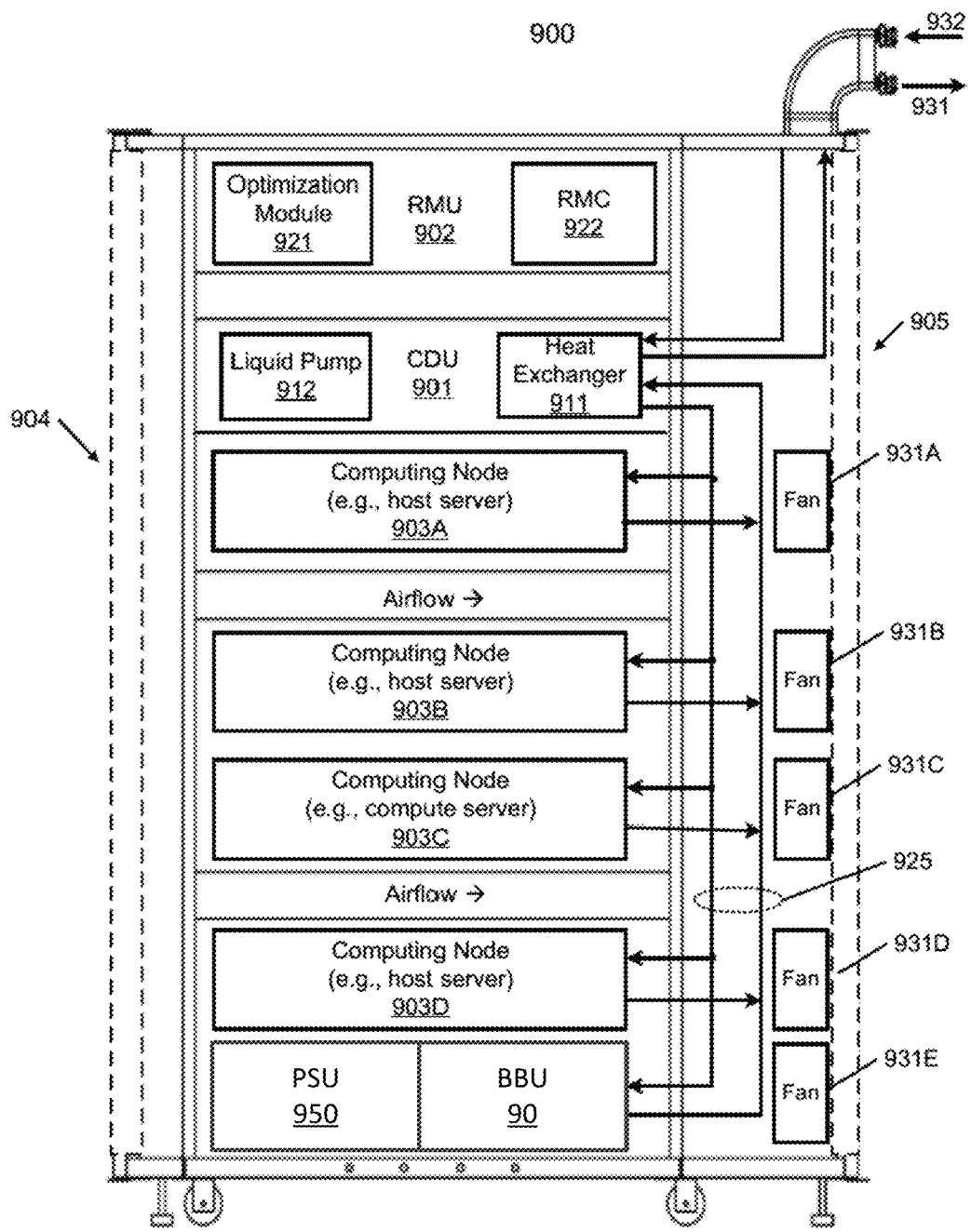
FIG. 9 shows an example of an electronic rack containing a battery backup unit (BBU) according to one embodiment.

FIG. 9 is a block diagram illustrating an example of an electronic rack according to one embodiment. Electronic rack 900 may include one or more server slots to contain one or more servers respectively. Each server includes one or more information technology (IT) components (e.g., processors, memory, storage devices, network interfaces). According to one embodiment, electronic rack 900 includes, but is not limited to, CDU 901, rack management unit (RMU) 902 (optional), a power supply unit (PSU) 950, the BBU 90 (which may include a battery thermal management system with any of the components as described herein, such as a battery module, a controller, a pump, and/or a cooling unit), and one or more server blades 903A-903D (collectively referred to as server blades 903). Server blades 903 can be inserted into an array of server slots respectively from frontend 904 or backend 905 of electronic rack 900. The PSU 950 and/or BBU 90 may be inserted into any of server slots 903 within the electronic rack 900. In one embodiment, one or more BBUs may be inserted into any of the server slots 903 within the electronic rack 900.

Note that although there are only four server blades 903A-903D shown here, more or fewer server blades may be maintained within electronic rack 900. Also note that the particular positions of CDU 901, RMU 902, PSU 950, BBU 910, and server blades 903 are shown for the purpose of illustration only; other arrangements or configurations of CDU 901, RMU 902, BBU 910, and server blades 903 may also be implemented. Note that electronic rack 900 can be either open to the environment or partially contained by a rack container, as long as the cooling fans can generate airflows from the frontend to the backend.

In addition, a fan module can be associated with each of the server blades 903, and the BBU 90. In this embodiment, fan modules 931A-931E, collectively referred to as fan modules 931, and are associated with server blades 903A-903D and BBS 1 respectively. Each of the fan modules 931 includes one or more cooling fans. Fan modules 931 may be mounted on the backends of server blades 903 and BBU 90 to generate airflows flowing from frontend 904, traveling through the air space of the sever blades 903, and existing at backend 905 of electronic rack 900. In one embodiment, each of the fan modules may be mounted on the backends of the server blades 903 and one or more BBUs.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid supply/return lines 931-932 to form a primary loop. The connectors coupled to the external liquid supply/return lines 931-932 may be disposed or mounted on backend 905 of electronic rack 900. The liquid supply/return lines 931-932 are coupled to a set of room manifolds, which are coupled to an external heat removal system, or external cooling loop. In addition, heat exchanger 911 further includes a second loop with two ports having a second pair of liquid connectors coupled to liquid manifold 925 to form a secondary loop, which may include a supply manifold to supply cooling liquid to server blades 903 and a return manifold to return warmer liquid back to CDU 901. Note that CDUs 901 can be any kind of CDUs commercially available or customized ones. Thus, the details of CDUs 901 will not be described herein. As an example, the BBU 90 may connect to 925 to complete a full fluid loop.

Each of server blades 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. Server blades 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 900 further includes optional RMU 902 configured to provide and manage power supplied to servers 903, fan modules 931, and CDU 901. Optimization module 921 and RMC 922 can communicate with a controller in some of the applications. RMU 902 may be coupled to PSU 950 to manage the power consumption of the PUS. The PSU 950 may include the necessary circuitry (e.g., an alternating current (AC) to direct current (DC) or DC to DC power converter, backup battery, transformer, or regulator, etc.) to provide power to the rest of the components of electronic rack 900.

In one embodiment, RMU 902 includes optimization module 921 and rack management controller (RMC) 922. RMC 922 may include a monitor to monitor operating status of various components within electronic rack 900, such as, for example, computing nodes 903, CDU 901, and fan modules 931. Specifically, the monitor receives operating data from various sensors representing the operating environments of electronic rack 900. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Once the optimal pump speed and optimal fan speeds have been determined, RMC 922 configures liquid pump 912 and cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance are adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds.

Note that some or all of the IT components of servers 903 (e.g., 903A, 903B, 903C, and/or 903D) may be attached to any one of the cooling devices described above, either via air cooling using a heatsink or via liquid cooling using a cold plate. One server may utilize air cooling while another server may utilize liquid cooling. Alternatively, one IT component of a server may utilize air cooling while another IT component of the same server may utilize liquid cooling. In addition, a switch is not shown here, which can be either air cooled or liquid cooled. In one embodiment, the location of the equipment or components of the electronic rack, such as the PSU and BBU may be varied, and may not be exactly as shown in this figure.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

Figure 10:
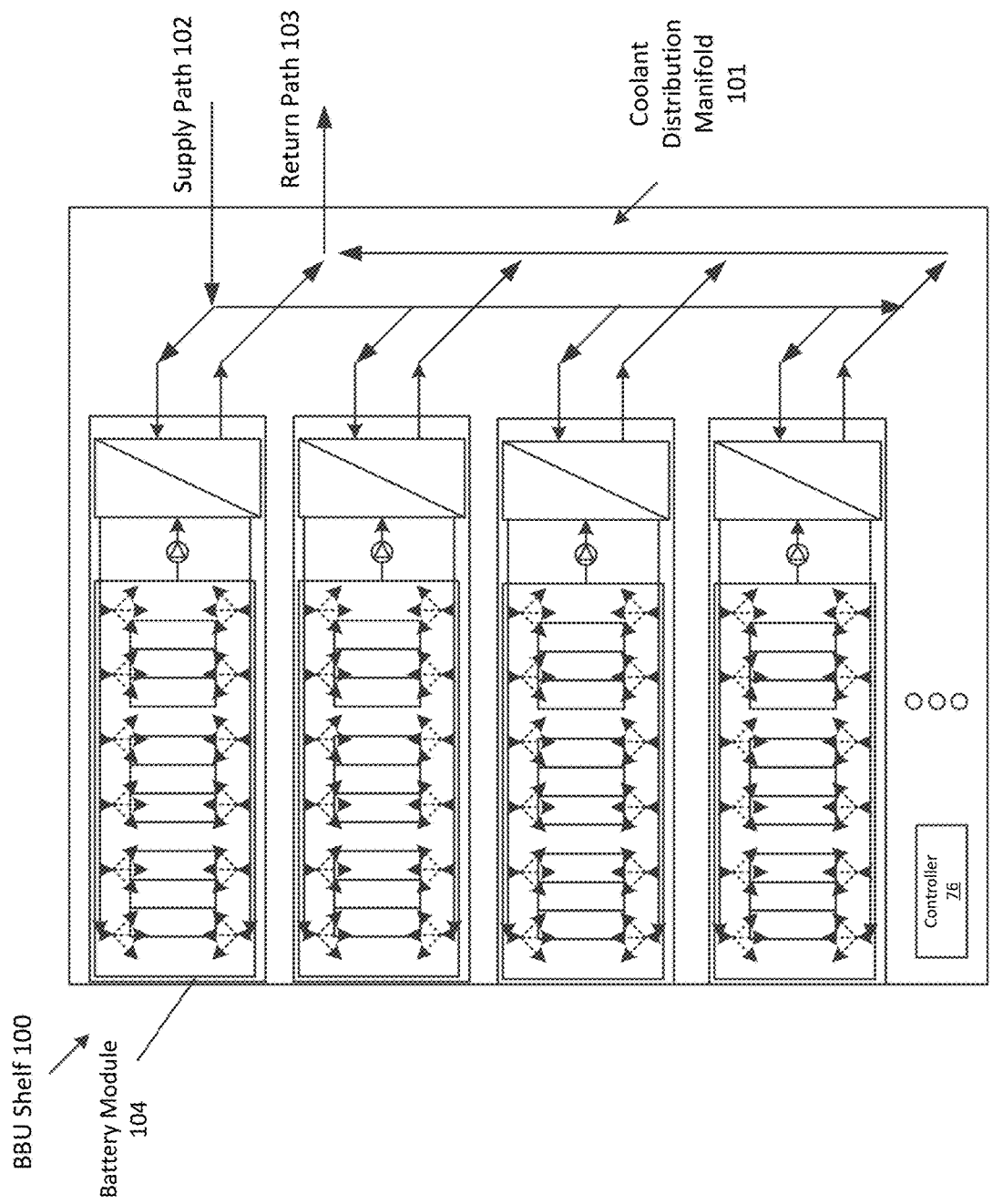
FIG. 10 shows an example of a BBU shelf with several battery modules populated therein according to one embodiment.

FIG. 10 is an example of a BBU shelf with several battery modules populated therein according to one embodiment. This figure shows BBU shelf 100 that includes four battery modules 104, a coolant distribution manifold 101, and a controller 76. Each of the battery modules is a sealed system that includes the battery cells, two sets of spray nozzles coupled to separate supply lines, a pump, and a cooling unit. In one embodiment, each of the battery modules may be the same or different with respect to one another. For example, one battery module may be a sealed system with spray nozzles that are above the cells (as illustrated in FIG. 3), and another battery pack may be the same as illustrated in this figure.

In one embodiment, the distribution manifold 101 is coupled to heat exchanger 911 via manifold 925 to create a heat-exchanging loop (e.g., the primary loop as described herein). Specifically, a supply line of each of the packs is coupled to a supply path 102 of the manifold 101 and a return line of each of the packs is coupled to a return path 103 of the manifold 101 in order for the modules to be a part of the primary heat-exchanging loop. Each of the paths may be coupled to a corresponding path (or line) of the manifold 925 in order to allow coolant from the heat exchanger 911 to circulate through each of the battery module. In one embodiment, the distribution manifold 101 may be coupled to one or more heat exchangers. In some embodiments, rather than (or in addition to) having a coolant distribution manifold 101, the battery modules of the BBU may (e.g., directly) connect (or removeably couple) to the liquid manifold 925 of the electronic rack.

The controller 76 is configured to activate at least some of the heat-exchanging loops within the battery modules (e.g., by controlling a pump integrated therein). Specifically, the controller 76 may perform similar operations as described herein with respect to controller 75. In one embodiment, however, each of the battery module's controllers may control the loop as described herein.

In another embodiment, one of the battery modules within the BBU 100 may include less components as illustrated herein. For example, a battery module may not include a cooling unit. Instead, a pump within the battery module may draw coolant from the primary loop to cause the spray nozzles to spray coolant of the primary loop to cool corresponding battery cells. In some embodiments, the pump may not be sealed within the battery module but instead may be a part of the BBU.

In one embodiment, although each battery thermal management system illustrated herein is described separately, any of the systems (or components within the systems or modules) may be used in conjunction with (or combined with) any of the other systems or modules described herein in order to create a heat-exchanging loop.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

As previously explained, an embodiment of the disclosure may be (or include) a non-transitory machine-readable medium (such as microelectronic memory) having stored thereon instructions, which program one or more data processing components (generically referred to here as a "processor") to perform battery thermal management operations, such as controlling a pump in order to spray coolant on battery cells while the cells are discharging/charging. In other embodiments, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A battery module that is mounted within an electronic rack, the battery module comprising:
a container;
an output connector;
a plurality of battery cells that are coupled to the output connector, wherein the battery cells are configured to provide battery energy to a piece of equipment mounted within the electronic rack via the output connector and are configured to draw power from an external power supply to charge the battery cells via the output connector;
a plurality of spray nozzles that are configured to spray coolant on the plurality of battery cells to transfer heat generated by the battery cells to the sprayed coolant; and
a pump that is coupled to the plurality of spray nozzles and is configured to push coolant out of the spray nozzles,
wherein the plurality of battery cells, the plurality of spray nozzles, and the pump are sealed within the container.

2. The battery module of claim 1, wherein the container includes a basin that is located below the plurality of battery cells and collects the coolant that is sprayed by the spray nozzles.

3. The battery module of claim 2, wherein a cooling unit is coupled between the plurality of spray nozzles and the pump, wherein the pump is arranged to draw coolant that is collected in the basin and pushes the drawn coolant through the cooling unit and out of the spray nozzles.

4. The battery module of claim 2, wherein the container includes a supply connector that is coupled to the pump and a return connector that is disposed on the basin, wherein, while a cooling unit is coupled to the container via the supply connector and the return connector and while the pump pushes coolant, the cooling unit draws coolant that is collected in the basin and supplies coolant to the pump.

5. The battery module of claim 2, wherein the pump is arranged to draw coolant from a cooling unit, and while the pump pushes coolant, the cooling unit draws coolant that is collected in the basin via a return line, thereby creating a heat-transfer loop.

6. The battery module of claim 4, wherein the plurality of battery cells, the plurality of spray nozzles, the pump, and the cooling unit are sealed within the container.

7. The battery module of claim 1, wherein the plurality of spray nozzles are located above the plurality of battery cells.

8. The battery module of claim 1, wherein the plurality of spray nozzles are located along at least one side of the plurality of battery cells.

9. The battery module of claim 1, wherein the plurality of spray nozzles are configured to spray coolant when the plurality of battery cells are either 1) providing battery energy to a load or 2) drawing power from the external power supply.

10. The battery module of claim 1, wherein the plurality of battery cells are at least partially submerged within coolant that is collected at a bottom of the container.

11. The battery module of claim 1 further comprising a coolant spraying panel that comprises a pressurized coolant chamber that is configured to hold coolant at a higher pressure than outside of the chamber, wherein each of the plurality of spray nozzles is coupled to the coolant spraying panel and are each configured to spray pressurized coolant on the plurality of battery cells.

12. A battery backup unit (BBU) that is mounted within an electronic rack, the BBU comprising:
a set of one or more battery modules, wherein each battery module comprises
a container, an output connector, a plurality of battery cells that are coupled to the output connector, wherein the battery cells are configured to provide battery energy to a piece of equipment mounted within the electronic rack via the output connector and are configured to draw power from an external power supply to charge the battery cells via the connector, a plurality of spray nozzles that are configured to spray coolant on the plurality of battery cells to transfer heat generated by the battery cells to the sprayed coolant, a pump that is coupled to the plurality of spray nozzles and is configured to push coolant out of the spray nozzles, wherein the plurality of battery cells, the plurality of spray nozzles, and the pump are sealed within the container.

13. The BBU of claim 12, wherein the container includes a basin that is located below the plurality of battery cells and collects the coolant that is sprayed by the plurality of spray nozzles.

14. The BBU of claim 13, wherein the battery module further comprises a cooling unit that is coupled to the pump and is configured to draw the coolant that collects in the basin, extract heat from the drawn coolant to produce cooler coolant than the drawn coolant, and supply the cooler coolant to the pump, while the pump is in operation, thereby creating a heat transfer loop.

15. The BBU of claim 14, wherein the cooling unit is located at one of a side of the battery module or on top of the battery module.

16. The BBU of claim 14, wherein the battery module is removably coupled to the cooling unit.

17. The BBU of claim 14, wherein the plurality of spray nozzles, the pump, and the cooling unit are sealed within the container, wherein the cooling unit draws coolant that is within the basin via a return line that extends into the basin.

18. The BBU of claim 13, wherein the plurality of battery cells are at least partially submerged within the coolant that is collected within the basin.

19. The BBU of claim 13, wherein the battery module comprises a coolant spraying panel that comprises a pressurized coolant chamber that is configured to hold coolant at a higher pressure than outside of the chamber, wherein each of the plurality of spray nozzles is coupled to the coolant spraying panel and are each configured to spray pressurized coolant on the plurality of battery cells.

20. An electronic rack comprising:

a plurality of server blades arranged in a stack, each server blade including one or more servers to provide data processing services;

a power supply coupled to the server blades to provide power to operate the servers; and a battery backup unit (BBU) coupled to the server blades to provide backup power to the servers when the power supply is unable to provide power, wherein the BBU comprises at least one battery module, wherein each battery module comprises a container, a plurality of battery cells from which the BBU draws battery energy to provide the backup power, a plurality of spray nozzles that are configured to spray coolant on the plurality of battery cells, and a pump that is coupled to the plurality of spray nozzles and is configured to push coolant out of the spray nozzles, wherein the plurality of battery cells, the plurality of spray nozzles, and the pump are sealed within the container.

* * * * *